Feb. 19, 1957

H. M. PIKER 2,781,937

INSULATED CONTAINER

Filed Dec. 24, 1952

INVENTOR.
HERBERT M. PIKER
BY
Joseph A. Rave
Attorney

United States Patent Office 2,781,937
Patented Feb. 19, 1957

2,781,937

INSULATED CONTAINER

Herbert M. Piker, Wyoming, Ohio, assignor to The Hamilton Metal Products Company, Hamilton, Ohio, a corporation of Ohio Application December 24, 1952, Serial No. 327,859

6 Claims. (Cl. 220—17)

This invention relates to improvements in insulated portable containers such as may be employed in transporting food products and for maintaining the same in a cool or warm condition for a number of hours duration.

Broadly, insulated portable containers are known and have been used on camping trips, picnics, and the like for transporting either hot or cold liquids or solid foods and for maintaining the said liquid and food in either the hot state or the cold state until used, such as for a day's time or more up to as much as several days' duration. This invention pertains, primarily, to portable insulated containers of a size which will receive bottled goods in reasonable quantities as well as additional foods that should be kept cold for avoiding spoilage, as well as retaining same in a palatable condition, and the invention is particularly concerned with the provision of means whereby said foods may be retained in a position separate and apart from the bottled goods. It is frequently desired to transport ice, either in cracked form or as cubes, and at the same time transport other food and this invention contemplates the provision of means whereby the said food may be retained in a position in the container apart from the said ice.

The present invention is an improvement on the "Insulated Container" disclosed in applicant's pending application Serial No. 155,945, filed April 14, 1950, and now abandoned.

The principal object of this invention is the provision of an insulated container having incorporated therein removable means which establishes within the container a separate compartment.

Another object of this invention is the provision of an insulated container that will accomplish the foregoing object but that is economical to produce and obtain for thereby placing it within economical reach of large numbers of persons.

A further object of this invention is the provision of an insulated container provided with simple means that in no wise interferes with the normal functioning of the container and which cooperates with removable means that acts as a shelf or partition between the top and bottom of the container and thereby establishes an upper and lower compartment in the container each for its own and separate use.

A still further object of this invention is the provision in an insulated container of a suspended removable tray with the latter so designed that it can with facility be placed in a suspended position within the container, readily removed from the container or placed on the bottom of the container without distorting the said tray.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

Figure 1:
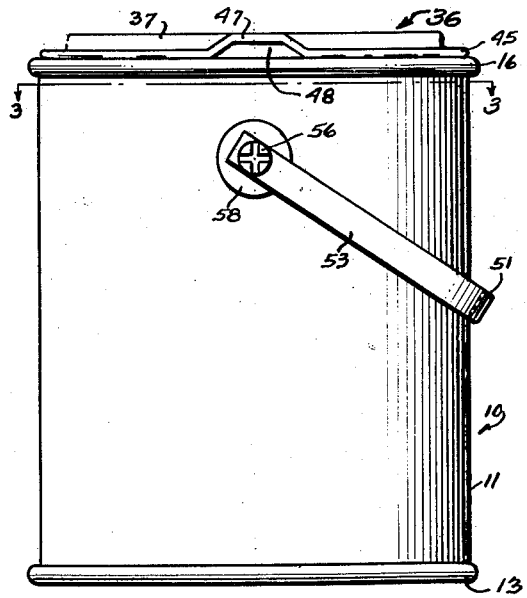
Fig. 1 is an elevational view of an insulated container incorporating the improvements of the present invention.

The insulated container of the present invention comprises an outer or bucket-like container 10 including a body member 11, preferably cylindrical in plan. Secured to the lower end of the body member 11 is a bottom 12 substantially disc-like in plan with its periphery rolled or turned on itself to provide a hook-like portion 13. Interengaged with the hook-like portion 13 is a substantially similar hook-like portion 14 at the lower end of the body member 11. Said hook-like portions 13 and 14 are interengaged with one another and rolled to form a bead or seam as is usual practice in connecting sheet metal members to one another and with said resulting bead projecting somewhat below the bottom 12.

The upper end of the container body 10 is similarly formed or upset to provide a hook 15 adapted to be received and interengaged with a hook-like bead 16 at the upper end of an upstanding flange 17 at the outer periphery of a ring-like member 18. The ring-like member 18 forms the top for the insulation compartment of the container as will presently be made clear.

The ring-like member 18 has upstanding therefrom a peripheral inner flange 19 provided at its upper end with a hook-like bead 20. The interior diameter of the ring-like member 18, as defined by the inner peripheral flange 19, is to a diameter to just admit the upper end of an inner container 21 which in general is to the same configuration as the outer container 10 except that it is to smaller dimensions.

Accordingly, the inner container 21 is provided with a body member 22 having at its upper end an outwardly projecting hook-like bead 23 which is interengaged with the ring-like member hook-like bead 20. The lower end of the inner container body 22 is disposed in a peripheral hook 24 formed at the periphery of the inner container bottom 25, which like the bottom 12 of the outer container, is disc-like in plan.

The several hook-like interengaging parts, 15—16, 20—23, and 24 and lower end of inner container body member 22, are respectively rolled on one another to provide the usual metal seams for joining the parts permanently to one another, and, as set forth in the above identified co-pending application, a suitable sealing strip or sealing compound is incorporated with each metal seam or bead in order that the same may be a substantially hermetically sealed joint.

In the final assembly of the inner and outer containers a space is provided between the container's body portions 11 and 22 thereof, in which is disposed insulating material 26 which may take any suitable or desirable form for preventing, or at least retarding, transfer of heat between the interior of the inner container and exterior of the outer container. By the same token the spacing of the bottom 25 of the inner container upwardly of the bottom 12 of the outer container provides a compartment for insulation 27. The insulation 27 is illustrated as of a corrugated layer type while the insulation 26 is illustrated as of a tangled or fiber type, but it is to be understood that either insulation may be used in either compartment. It will further be noted that the upper end of the insulation compartment between the container body portions is closed by the ring-like member 18.

The inner container body portion 22 is provided downwardly of its open upper end with an inwardly projecting bead 28, shown as rounded inwardly from the said container body 22 and without any sharp corners for the accumulation of foreign matter. It will further be noted that in forming the bead 28 the material of the container body 22 is in no wise broken or pierced thereby eliminating the possibility of communication between the interior of the inner container 21 and the insulation compartment outwardly thereof. The bead 28, which may also be described as a ledge, is intended to form a means for suspending within the inner container and transversely thereof a partition or compartments forming means interiorly of the inner container 21. It is to be understood that this transverse partition, shelf, or the like, may take any suitable or desirable form even to the extent of a relatively flat member even though the partition illustrated in the drawings and subsequently to be described in detail is in the form of a tray indicated in general by the reference numeral 29.

The tray 29 may be formed of any suitable or desirable material and ideally is formed of one of the synthetic resin materials known as "plastic," and comprises a bottom 30 with an upstanding peripheral flange or wall 31. The upper end of the flange or wall 31 is outwardly turned as a bead or peripherally projecting rim 32 which engages with the bead or ledge 28 for suspending the same in operative position. It will be noted that the diameter of the peripheral bead or rim 32 is such as to closely approach the interior diameter of the inner container so as to pass freely within the inner container but not to pass the bead or ledge 28. It will also be noted that the exterior diameter of the tray flange or wall 31 is such as to readily and freely pass through the said bead or ledge 28.

Figure 3:
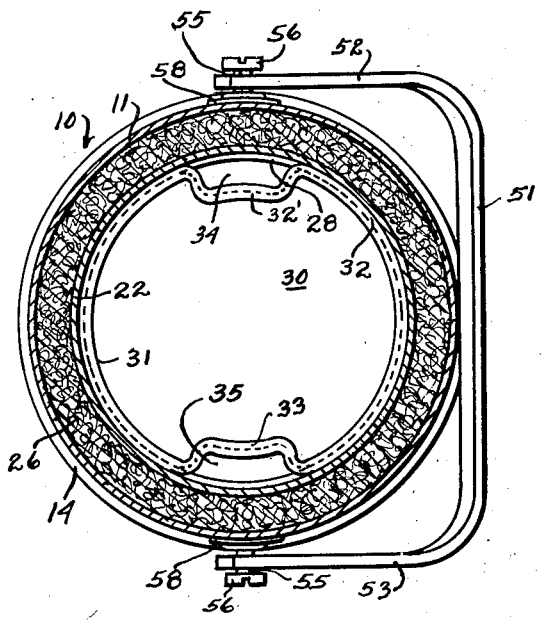
Fig. 3 is a horizontal sectional view of the container as seen from line 3—3 on Fig. 1.
Figure 4:
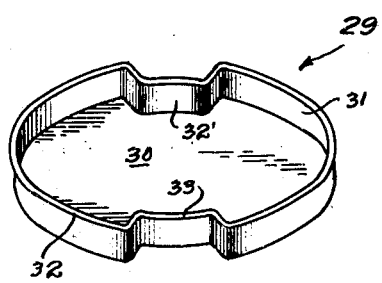
Fig. 4 is a perspective view of a tray utilizable with the insulated container and forming a detail of the present invention.

The tray 29 must be provided with means whereby it may be readily engaged for removal from the container and for placing it in operative position. These means may take any suitable or desirable form, that shown in the drawings, see Figs. 3 and 4, comprising inwardly depressing the tray flange or wall 31 together with its radially projecting bead or rim 32 at diametrically opposite points, such as 32 and 33. By this construction there is provided openings 34 and 35 between the said inwardly formed portions and the adjacent surface of the inner container body. The said openings 34 and 35 may be designated as hand holes through which the user's fingers are inserted to engage the undersurface of the tray bottom 30 whereupon an upward lifting removes the tray.

The upper end of the inner container 21 is closed by an insulating lid or cover indicated in its entirety by the reference numeral 36. The said insulating cover or lid may take any suitable or desirable form that shown in the drawings comprising a pair of substantially similar stampings 37 and 38 arranged in inverted relation to one another and each, respectively, comprising a body portion 39 and 40 respectively having projecting from one another a substantially vertically peripheral wall 41 and 42. Said stampings walls being arranged in effect in vertical alignment and each, respectively, having projecting from its end a horizontal flange 43 and 44 which are disposed in face contact with one another. The outer perimeter of said flanges 43 and 44 are turned on one another as at 45 to permanently secure the stampings to one another. By this construction there is provided interiorly of the lid or cover and between the body portions 39 and 40 of the stampings a compartment for insulation 46 which, preferably, takes the form of a corrugated layer insulation, such as 27 between the bottoms of the containers.

Figure 2:
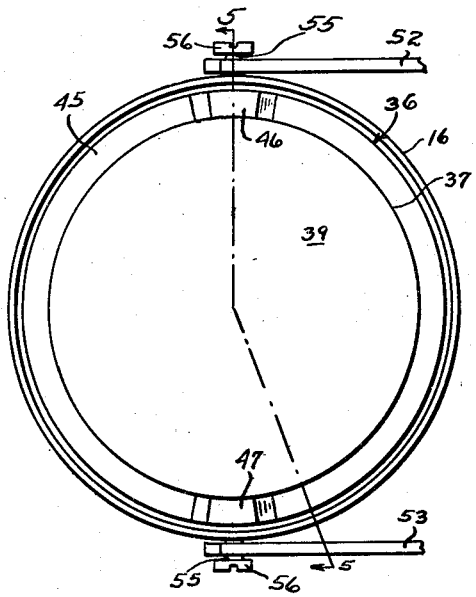
Fig. 2 is a top plan view of the container of Fig. 1.

The wall or flange 42 of the lower stamping 40 is to a diameter to snugly engage the upper end of the inner container body 22 and form a leak proof joint. The joint is such that a reasonable amount of force must be exerted in order to remove the lid or cover and to assist in engaging the said lid or cover the composite horizontal flanges 43—44 are, at diametrically opposite points, slightly raised to form hand holds or grips as at 46 and 47, see Fig. 2. By this construction there is provided below the said raised portions an opening 48 for the user's fingers.

Figure 5:
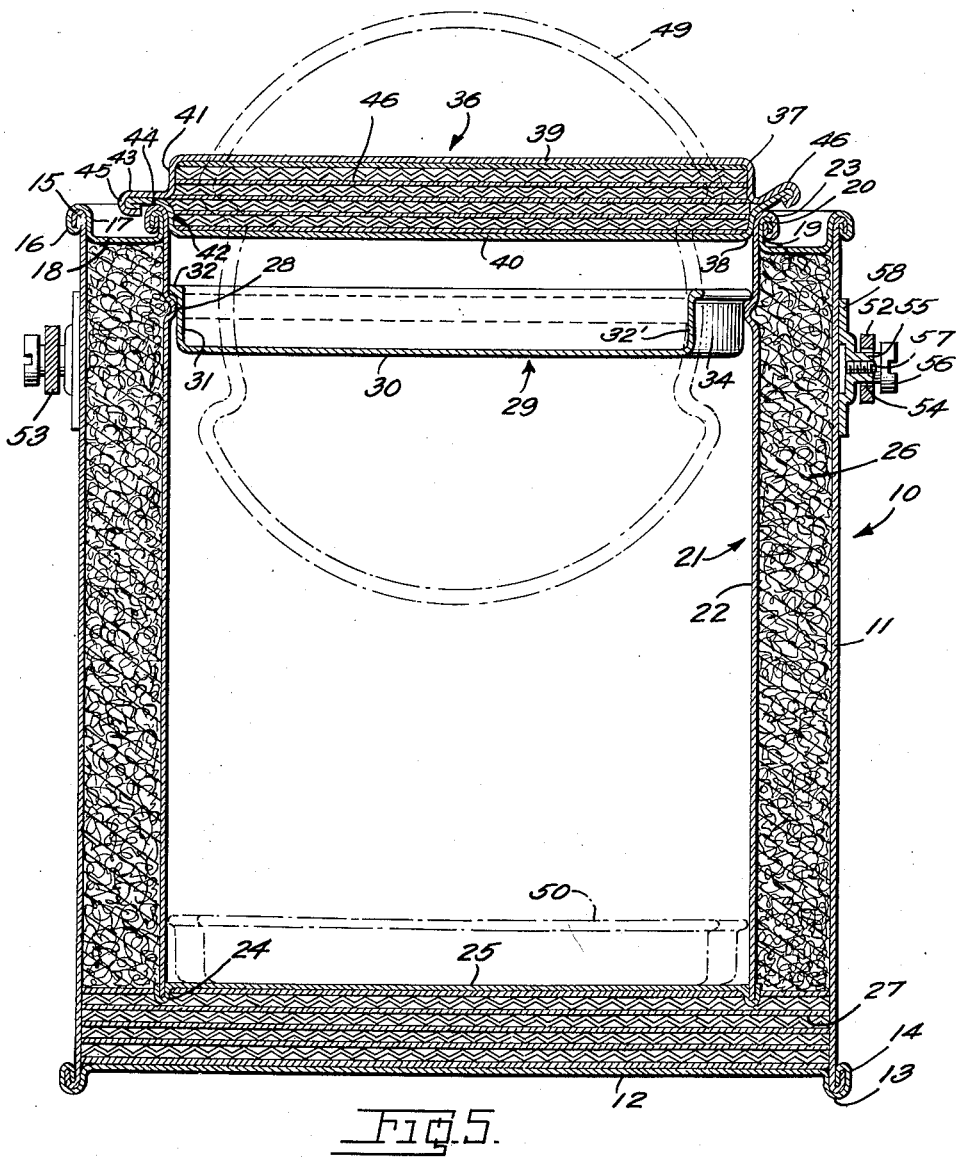
Fig. 5 is an enlarged vertical sectional view of the container as seen from line 5—5 on Fig. 2.

From the foregoing description it will be noted that the tray 29 divides the interior of the inner container into two compartments, the one including the portion thereof between the upper surface of the tray bottom 30 and the undersurface of the lid or cover 36, while the other compartment comprises the portion below the tray bottom 30 and the upper surface of the inner container bottom 25. As illustrated in the drawings these compartments are of dissimilar vertical dimensions but need not necessarily be so. With the device as illustrated in Fig. 5 the compartment below the tray bottom 30 may contain bottled goods or solid bulky items while the upper compartment would contain fragile food such as meat, butter, and the like. If desired, and as intimated above, the lower compartment may contain ice in cracked or cube form while the upper compartment would contain food that it is not desired to have in direct contact with the ice or any water that might result from the said ice.

In the event that it is not desired to use the tray 29 in its suspended position it can be disposed at the bottom of the container and thus always be kept with the container. This is readily accomplished by arranging the tray in a vertical position, as illustrated in phantom lines at 49 in Fig. 5, and bringing the openings or hand holes 34 and 35 simultaneously at the diameter of the inner container which would permit the said tray to pass through bead or ledge 28 and when the tray is below the said bead or ledge 28 it may be turned through 90° and placed on the bottom 25 of the inner container 21 as shown in phantom lines at 50 in said Fig. 5.

Any suitable or desirable means for transporting the container may be employed, that shown in the drawings comprising a bail type handle 51 which includes arms 52 and 53. Each of the arms 51 and 52 is provided with an aperture 54 through each which projects the shank 55 of a cap nut 56. Each of the nuts 56 is respectively threaded on a bolt 57 held in position by a plate 58 secured to the outer surface of the outer container 10.

From the foregoing it will now be appreciated that there has been provided a portable insulated container that accomplishes the objects initially set forth.

What is claimed is:

1. An insulated container of the class described comprising an inner bucket including an open upper end, a bottom and an upstanding body portion from the perimeter of the bottom, a bead or ledge inwardly projecting from said body portion at a point intermediate the bottom and its upper end, said inner bucket being substantially circular in plan to a given inner diameter for the full heighth of its body portion and said inwardly projecting bead or ledge inwardly projecting equally at all points from the container body portion, and a shallow tray including a bottom and upstanding wall with an outwardly projecting radial rim at the upper end of the wall and with the diameter of the tray wall such as to pass through the inwardly projecting bead or ledge and the rim having a diameter substantially equal to the inner diameter of the bucket for engagement with the said bead or ledge and thereby suspend the tray within the inner bucket, said tray bottom, upstanding wall and radial rim being so formed, at least, at one place on the circumference thereof so as to provide a space between said tray bottom, upstanding wall and radial rim and the bucket body portion and its inwardly projecting bead or ledge to form a hand hole whereby the tray may be grasped for positioning with and removal from the interior of the bucket.

2. An insulated container of the class described comprising an inner bucket including an open upper end, a bottom and an upstanding body portion from the perimeter of the bottom, a bead or ledge inwardly projecting from said body portion at a point intermediate the bottom and its upper end, said inner bucket being substantially circular in plan to a given inner diameter for the full heighth of its body portion and said inwardly projecting bead or ledge inwardly projecting equally at all points from the container body portion, and a tray including a bottom and upstanding wall with an outwardly projecting radial rim at the upper end of the wall and with the diameter of the tray wall such as to pass through the inwardly projecting bead or ledge and the rim having a diameter substantially equal to the inner diameter of the bucket for engagement with the said bead or ledge and thereby suspend the tray within the inner bucket, said tray bottom, upstanding wall and radial flange being depressed, at least, at one place on the circumference thereof to provide a hand hole between the tray and inner bucket body member whereby the tray may be grasped for positioning within and removal from the inner bucket.

3. An insulated container of the class described comprising an inner bucket including an open upper end, a bottom and an upstanding body portion from the perimeter of the bottom, a bead or ledge inwardly projecting from said body portion at a point intermediate the bottob and its upper end, said inner bucket being substantially circular in plan to a given inner diameter for the full heighth of its body portion and said inwardly projecting bead or ledge inwardly projecting equally at all points from the container body portion, and a tray including a bottom and upstanding wall with an outwardly projecting radial rim at the upper end of the wall and with the diameter of the tray wall such as to pass through the inwardly projecting bead or ledge and the rim having a diameter substantially equal to the inner diameter of the bucket for engagement with the said bead or ledge and thereby suspend the tray within the inner bucket, said tray bottom, upstanding wall and rim having at diametrically opposite points inwardly formed depressions to provide hand holes between said tray points and inner bucket body portion to permit grasping the tray for insertion in and removal from the inner bucket.

4. An insulated container of the class described comprising an inner bucket including an open upper end, a bottom and an upstanding body portion from the perimeter of the bottom, a bead or ledge inwardly projecting from said body portion at a point intermediate the bottom and its upper end, said inner bucket being substantially circular in plan to a given inner diameter for the full heighth of its body portion and said inwardly projecting bead or ledge inwardly projecting equally at all points from the container body portion, and a tray including a bottom and upstanding wall with an outwardly projecting radial rim at the upper end of the wall and with the diameter of the tray wall such as to pass through the inwardly projecting bead or ledge and the rim having a diameter substantially equal to the inner diameter of the bucket for engagement with the said bead or ledge and thereby suspend the tray within the inner bucket, said tray bottom, upstanding wall and rim having at diametrically opposite points inwardly formed depressions to provide hand holes between said tray points and inner bucket body portion to permit grasping the tray for insertion in and removal from the inner bucket, said tray between corresponding ends of opposite depressions having a dimension less than the diameter through the inwardly projecting bead or ledge whereby the tray may be lowered within the inner bucket to be positioned on its bottom.

5. As an article of manufacture a tray for use with an insulated container comprising a bottom substantially circular in plan, a wall upstanding from the perimeter of the bottom, a radial flange outwardly projecting from the upper end of the wall, said tray bottom, upstanding wall and outwardly projecting radial flange being formed inwardly of the outer circumference of the tray for a short distance to provide a space for the user's hand in handling the tray.

6. As an article of manufacture a tray for use with an insulated container comprising a bottom substantially circular in plan, a wall upstanding from the perimeter of the bottom, a radial flange outwardly projecting from the upper end of the wall, said tray bottom, upstanding wall and outwardly projecting radial flange being provided at two diametrically opposite points respectively for a short distance with inward depressions to form defined spaces in the tray receiving the operator's hands in positioning the tray.

References Cited in the file of this patent
UNITED STATES PATENTS

| | | |
|---|---|---|
| 535,847 | Mertz | Mar. 19, 1895 |
| 1,014,911 | Scheaffer | Jan. 16, 1912 |
| 1,300,712 | Ferdon | Apr. 15, 1919 |
| 2,546,923 | Dunneback | Mar. 27, 1951 |